May 5, 1942. W. L. BROWN 2,281,670
GAS METER
Filed Feb. 19, 1940 3 Sheets-Sheet 1
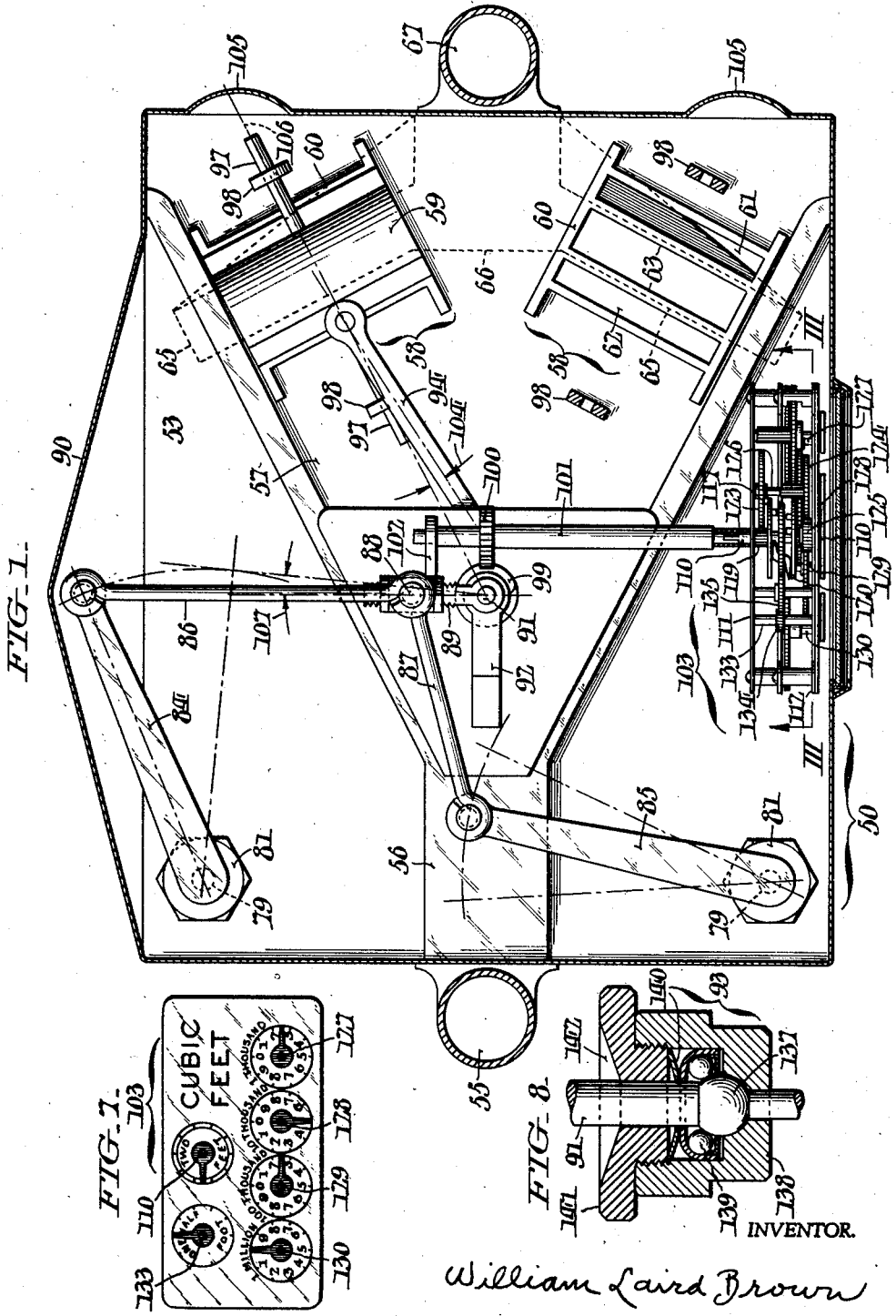
INVENTOR.
William Laird Brown

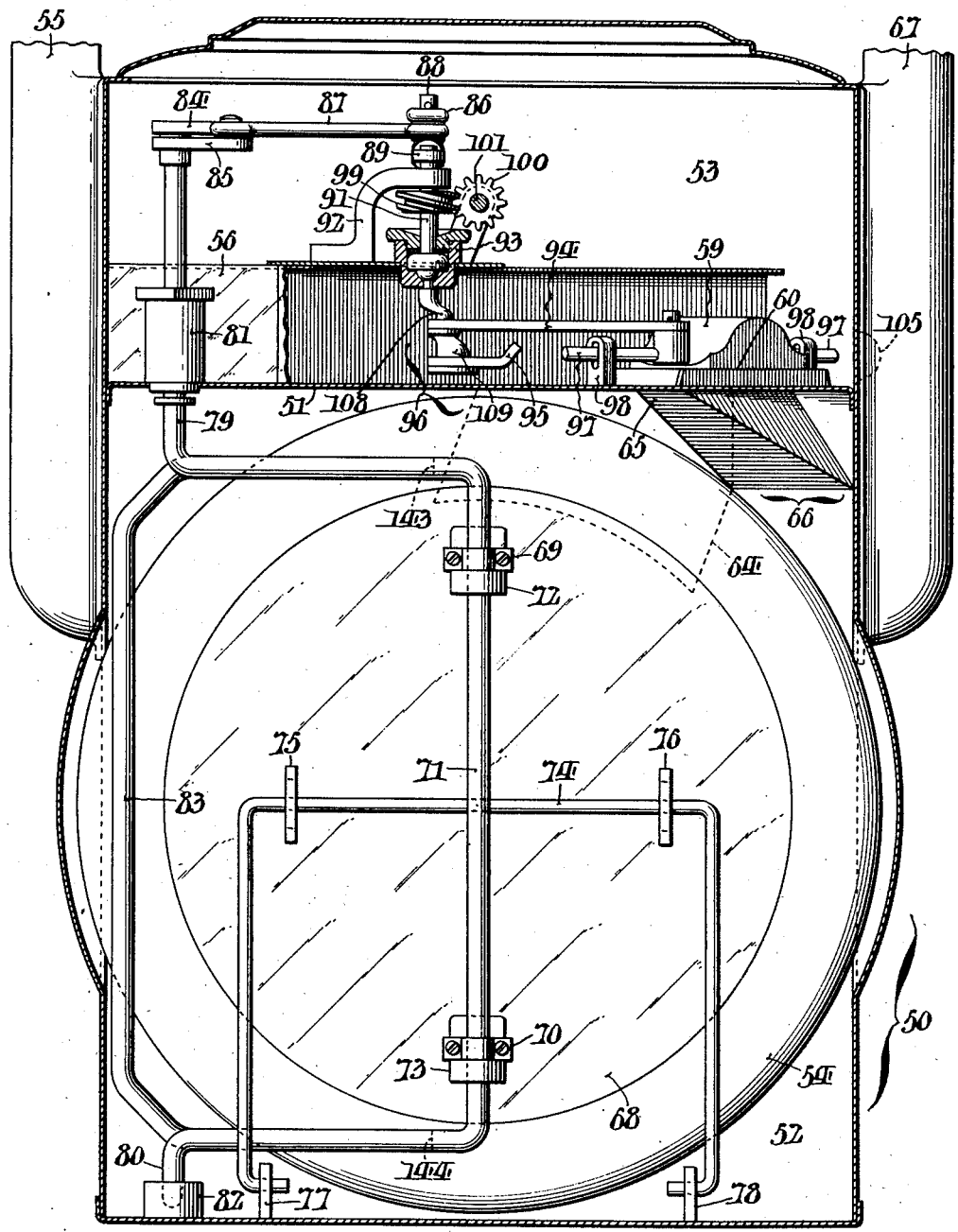

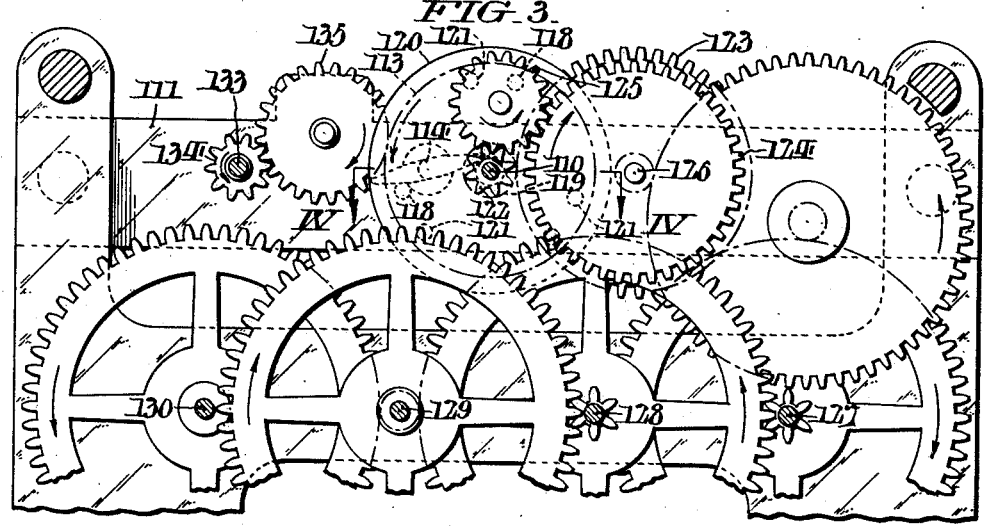
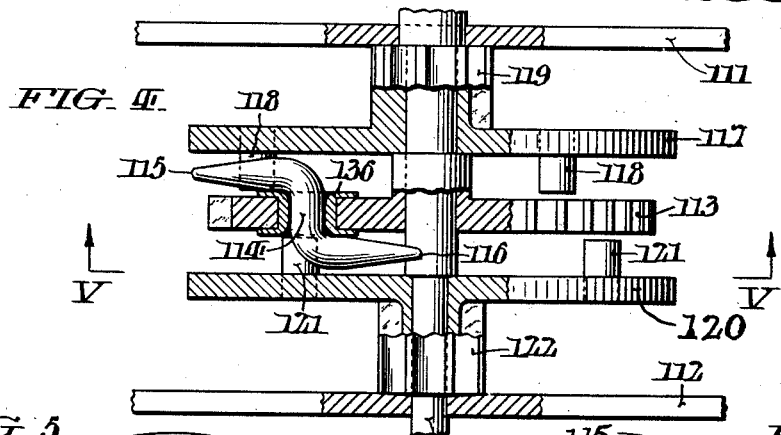
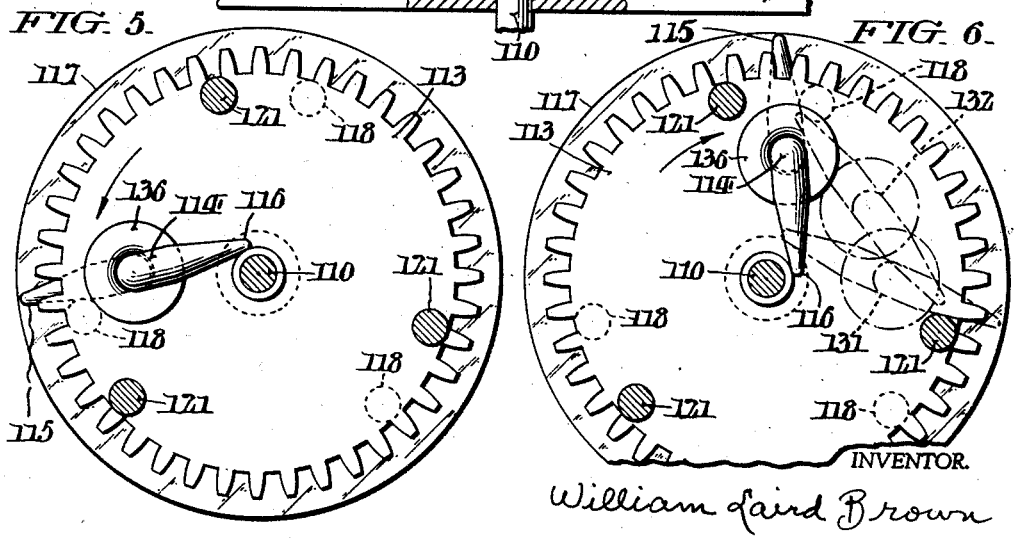

Patented May 5, 1942

2,281,670

UNITED STATES PATENT OFFICE 2,281,670

GAS METER

William Laird Brown, Lansdowne, Pa.

Application February 19, 1940, Serial No. 319,570

24 Claims. (Cl. 73—268)

This invention relates to meters of different types, including gas meters of the positive displacement type. In the meter shown, the gas traverses a pair of opposing bellows, which, through offset flag rods, actuate a linkage mechanism whereby a tangent arm is rotated, said tangent arm being secured to a valve crank shaft from which slide valves are reciprocated to control admission of gas to and from the bellows.

My invention has for one of its aims to increase meter capacity without increasing the speed of the moving parts; and at the same time to minimize irregularities of meter movement to insure the delivery of gas with smaller fluctuations in outlet pressure than obtain in ordinary meters. These objects I realize, as hereinafter more fully disclosed, through improved proportioning and arrangement of the linkage mechanism and the slide valves driven thereby.

I further aim to increase the accuracy of meter registration over a considerable period of service, and to reduce gas leakage, by the provision of an improved stuffing box.

Another object is to increase the stiffness and strength of the offset flag rod by reinforcing the portions thereof most subject to deflection, thus increasing the accuracy and smoothness of meter operation under varying conditions of service.

A further object of my invention is to attain the foregoing advantages in a meter which lends itself to very economical manufacture, from the standpoints both of the cost of the individual parts and of ready and easy assembly.

Other objects and attendant advantages will appear from the following detailed description of the attached drawings, wherein Fig. 1 is a staggered horizontal section of a gas meter conveniently embodying the present improvements, viewed from the top, with certain parts broken out or removed to expose important parts that would otherwise be hidden;

Fig. 2, a staggered longitudinal section of the meter viewed from the front, with certain parts broken out or removed;

Fig. 3, a front elevation of the index with the bottom portion broken out, in section as indicated by the arrows III—III of Fig. 1;

Fig. 4, a view from the top of a portion of the clutch mechanism of the index, partly in section as indicated by the arrows IV—IV of Fig. 3;

Fig. 5, an elevation in section as indicated by the arrows V—V of Fig. 4, showing the parts in driving position for counterclockwise rotation;

Fig. 6, a like elevation showing the parts in driving position for clockwise rotation, and two intermediate positions;

Fig. 7, a front elevation of the dial of the meter index;

Fig. 8, a sectional elevation of the stuffing box, with the corresponding shaft in place;

And Fig. 9, a plan view of a form of the offset flag rod alternative to the embodiment shown in Fig. 2.

The gas meter herein delineated for convenience of exemplifying my invention is generally of well known construction, having a generally rectangular casing 50, with a horizontal partition (valve table) 51 (Fig. 2) setting apart a comparatively high lower compartment 52 and a shallower upper compartment 53. The lower compartment 52 is in turn subdivided by a central longitudinal partition (not shown) into two chambers for the two bellows 54 of the meter. Leading from the gas inlet 55 is a channel 56, in this instance above the valve table 51, by which the gas is conducted to a box 57 (Fig. 1) containing the valves 58 whereby admission of gas to and from both sides of the bellows is controlled. Gas may be conducted from the inlet 55 to the valves 58 otherwise than herein shown by way of example, without affecting the advantages of my invention. Each of the valves 58 comprises a cover 59 which moves back and forth over a seat 60 to connect the outer ports 61 and 62 alternately with the center port 63. The diaphragm ports 62 communicate respectively with the inside of the bellows 54 through channels as instanced by dotted lines at 64 in Fig. 2; while the case ports 61 communicate respectively with the outsides of the bellows. The center ports 63 lead into the branches 65 of a fork channel 66 by which gas is conducted to the outlet 67 of the meter.

As shown, each bellows 54 carries a disc 68 (Fig. 2), whereon are mounted brackets 69, 70, in which the offset vertical portion 71 of the flag rod turns freely. Collars 72, 73, fast to offset portion 71, position the disc 68 as to height above the meter bottom. A disc guide wire 74, sliding in disc guides 75, 76, which are fast to disc 68, insures that the various positions of the disc during its travel shall be substantially parallel to each other, said guide wire being journalled in bearings 77, 78, fixed to the meter bottom. The offset vertical portion 71 is joined by transverse extensions to vertical portions of the flag rod 79 and 80, journalled respectively in the gas tight flag stuffing box 81, and in the flag rod bearing 82. Between the portions 79 and 80, and fixed thereto, extends a substantially vertical portion 83, for stiffening the structure. This offset flag rod combines the functions of the flag rod, flag, and rock shaft of ordinary meters.

Affixed to the upper ends of the portions 79 of the flag rods are flag arms 84, 85, which, through links 86, 87, are connected to the tangent post 88 on the tangent arm 89. The bulge 90 in the rear meter casing wall (Fig. 1) provides room for the movement of the rear flag arm 84. The tangent post 88 is adjustable along the threaded portion of the tangent arm 89, and is fixable in adjusted position by jam nuts as usual. The tangent arm 89 is adjustably fixed to the valve crank shaft 91, which is journalled near its upper end in the kingpost 92, and also in the gas tight crank stuffing box 93 (Fig. 2). The covers 59 of the valves 58 are reciprocated on the valve seats 60 by means of crank arms 94, 95, actuated by the crank member 96, which crank member is fast to the valve crank shaft 91. The valve covers 59 are confined to straight line motion by valve guide wires 97 engaging valve guides 98, room for motion being afforded by bulges 105. Worm 99, fast to valve crank shaft 91, drives an axle wheel 100 on axle 101. The axle at one end is journalled in an axle bearing 102 (Fig. 1), and at the other end is connected to the mechanism of the index, generally indicated at 103.

The refinements which I have made for the attainment of the important practical advantages hereinbefore pointed out are as follows:

The moving parts are proportioned and arranged (with exceptions to be noted later) generally as described in my co-pending application 291,843 filed Aug. 25, 1939, so as to bring the flag arms 84, 85 to the ends of their strokes when the valve covers 59 are at or very close to the corresponding points of admission, valve covers being set to give full opening of ports 61, 62 without wipeover. For this result, the angle 104 (which is the angle between crank arm 94 when valve cover 59 is in admission position, and the axis of valve cover motion 106) is equal, or very nearly equal, to the angle 107 (which is the angle between lines drawn from the extreme positions of the bearing axis of the rear flag arm 84, to the axis of valve crank shaft 91). The corresponding angle in respect to front flag arm 85 is also equal, or very nearly equal, to angle 104. This arrangement necessitates flag arm links 86 and 87 of different lengths.

Differing from my application 291,843, however, the present invention shifts the flag rods and valve crank shaft towards the inlet 55 of the meter, thus increasing the effective flag length, and decreasing the angle of sweep of the flag arms 84 and 85 for a given stroke of the disc 68. Thus the disc stroke is considerably increased without unduly increasing the angularity between the links 86, 87 and the tangent arm 89. This is important, because a considerable increase of such angularity increases the irregularity of meter operation, and also increases wear at the bearings. The lengthening of the disc stroke increases the volume of gas delivered per revolution of the meter; by which either increased meter capacity for a given size of meter, or slower speed at a given delivery per hour, or both together, may be secured.

A further difference from my application 291,843 is that the axes of valve cover motion are set at an acute angle, with a separate crank for driving each valve cover, instead of the usual arrangement, employed in the application mentioned, in which a single crank drives both valve covers, with axes at right angles. The present construction permits the valves to be positioned close to the outlet, thus avoiding interference between the fork channel branches 65 and the bellows 54 (or an increase of the height of compartment 52 to eliminate such interference) and permitting the use of a shorter fork channel 66. It will be seen that if the valve axes, passing through the valve crank shaft axis, were disposed at right angles as usual, the valves would have to be set further from the outlet 67, with the disadvantages mentioned. The upper crank bearing 108 (Fig. 2) is made smaller than the lower crank bearing 109, so that the lower crank arm 95 may be slipped over the upper crank bearing in assembling.

To secure the increased disc stroke contemplated, a collapsible form of bellows, such as shown in my co-pending application 238,133 filed Nov. 1, 1938, may be used, or any of several well known designs. Since the bellows employed forms no part of my present invention, it is not further detailed.

Referring now to my improved index:

If an ordinary meter is connected in reverse by a fraudulent consumer, and the commodity under supply passed through the meter in the reverse direction, entering at the meter outlet and coming out at the meter inlet, then the index movement will likewise be reversed, and the index reading will be decreased by the passage of the commodity, instead of being increased. To guard against this practice, reverse stop means have been commonly provided, so as to stop the reverse motion of the meter after a relatively small movement.

Such reverse stop devices as applied to gas meters are instanced in United States Patents 1,187,966 and 1,196,653, granted to me respectively on June 20, 1916 and Aug. 29, 1916. When a meter equipped with such a reverse stop device is connected in reverse, and gas passed through it, the meter moves backwards until further motion is prevented by the action of the stop device. Under this condition, if the pressure in the gas supply main is sufficient to raise the valve covers from their seats against the resistance of gravity and the adhesion between valve cover and seat due to gas condensation, a certain amount of gas will be delivered to the consumer's appliances without registering on the meter index. On the other hand, if the weight of the valve covers and the adhesion due to condensation are enough to hold them on their seats, then such strain may be brought on the movable parts of the meter as to deform permanently, or even break or loosen, some part thereof, thus affecting meter accuracy or preventing normal operation.

It is conceivable that, with certain relations of pressure in the main, weight of valve covers, and adhesion due to condensation, both these undesirable conditions may occur in the same meter, namely, fraudulent procurement of gas, and damage to the meter mechanism.

Therefore, as the reverse stop devices of the prior art do not in all cases prevent theft of gas by reversing the meter, and may by their action damage the meter mechanism, it is of advantage to omit the reverse stop device altogether, and to guard against theft through a reversed meter by providing an index that will register the passage of gas positively without regard to the direction of flow.

This has been accomplished in my invention, in which a proving head shaft 110, journalled in frame plates 111 and 112 (Fig. 4), is rotated by the meter mechanism in the usual manner by means of the axle 101. Fast to this shaft 110 is an element 113 carrying a clutch device, this element in the embodiment shown taking the form of a gear wheel, and journalled in this element 113 is a clutch device, here exemplified as a double-ended, self-reversing, pivoted pawl 114, having one end 115 disposed on one side of element 113, and the other end 116 on the other side. A clutch-driven member 117, in the present embodiment being a disc with pins 118 fast thereto, with a gear wheel 119 fast to said member, is journalled on proving head shaft 110, both member 117 and gear wheel 119 being loose on shaft 110. On the other side of element 113, another clutch-driven member 120, provided with pins 121 in the present embodiment, with a gear wheel 122 fast to said member, is journalled on proving head shaft 110, both member 120 and gear wheel 122 being loose on shaft 110.

The gear wheel 119 drives a gear wheel 123 (Figs. 1 and 3), and the gear wheel 122, through an intermediary 125, drives a gear wheel 124; and both these gear wheels 123 and 124 are fast to a secondary shaft 126, in the form of a pinion, journalled in frame plates 111 and 112 (Fig. 1), which secondary shaft drives the register shafts 127, 128, 129, and 130 (Fig. 7) through reduction gearing. In the size of meter chosen for illustration, the proving head shaft 110 may be arranged to revolve once for the passage of 2 cubic feet of gas through the meter, and the shafts 127, 128, 129, and 130 for the passage of 1,000, 10,000, 100,000, and 1,000,000 cubic feet respectively; and the reduction gearing arranged to correspond.

Normal direction of the proving head shaft 110, observed from the front of the meter, is counter clockwise rotation, and with this motion the element 113 will drive the member 117 directly by means of the pawl 114, one end 115 engaging one of the pins 118, and the other end 116 being in contact with the proving head shaft 110 (Figs. 4 and 5). The secondary shaft 126 will then be driven clockwise, and the passage of gas registered on the index. Meanwhile the gear wheel 122 will be driven by the gear wheel 124, through the intermediary 125, in an idling motion, pins 121 on member 120 (which member is fast to gear wheel 122) being clear of the pawl 114.

When the direction of the proving head shaft 110 is reversed to clockwise, as by reverse connection of the meter for the purpose of stealing gas, the pawl 114 will be moved backward without causing any rotation of the register shafts 127, etc., until after the end 115 of the pawl 114 strikes the pin 118 adjacent to the pin by which the pawl has been driving the index, as in the full line representation of the pawl in Fig. 6. When end 115 strikes the pin in backward movement, this will turn the other end 116 into position to engage one of the pins 121 on the other member 120; and, when end 115 has engaged the proving head shaft 110 (as in dash-and-dot lines at 131 in Fig. 6), the member 120 will be driven in a reverse, or clockwise, direction. An intermediate position of the pawl 114 is shown at 132.

The secondary shaft 126, (Fig. 3) however, and the rest of the registering mechanism of the index, will now be driven in the same directions as those in which they moved when driven by member 117 under counterclockwise rotation of proving head shaft 110, on account of the intermediary wheel 125, which reverses the direction of motion transmitted from the gear wheel 122 as compared to the direct drive from gear wheel 119; so that reverse motion of the meter will be registered on the index as if the meter were moving in the normal direction.

While member 120 is driving the index as outlined in the two foregoing paragraphs, the gear wheel 119 and the member 117 will be driven in an idling motion, with none of the pins 118 in contact with the pawl 114. Thus as long as the meter runs backwards, the index reading will be added to just as if the meter were operating normally.

When the proving head shaft resumes normal rotation, as when the meter is re-set in proper position, the pawl 114 will shift to engage one of the pins 118 on member 117, and the index will be driven in the normal manner.

Thus a selective clutch device is provided, by which the pawl 114 drives directly one member, 117, when the proving head shaft 110 rotates in the normal direction, with no contact meanwhile between the pawl and the other member 120; while in reverse motion of the proving head shaft, the pawl drives directly member 120 and is not in contact with member 117. Normal rotation of member 117 and reverse rotation of member 120 are both translated into the same direction of rotation in the register shafts of the index, as already explained.

If it is desired to include in the index an extra proving head shaft 133 (Figs. 3 and 7), revolving at a higher speed than the main proving head shaft 110 (as in most ordinary meters) such shaft 133 is driven by a gear wheel 134 fast thereto, through the intermediary 135, by the element 113, made in the form of a gear wheel as shown.

The bearing 136 in the element 113 (Figs. 4, 5) is made with a bore sensibly larger in diameter than the pawl 114, to present as little resistance as possible to the turning of the pawl, and to facilitate assembly.

It should be noted that the proving head shaft 110 is driven directly by the axle 101, as in the ordinary meter, and the extra proving head shaft 133 is driven from the proving head shaft; so that my construction does not increase the lost motion of the shafts referred to, as compared to ordinary index design. This is important because of the use made of these shafts in proving and testing the meter with the top cover in place.

One of the objects of certain reverse stop devices of the prior art, as in my Patents 1,187,966 and 1,196,653 already mentioned, was to allow a certain minimum backward motion before the stop was applied. In normal operation, when the consumer's appliances are all shut off after a period of use, the corresponding distribution piping is filled with gas at about the temperature of the underground street main. This gas when at rest would rise in temperature, as the atmosphere around the piping is usually warmer than the street main, and this rise in temperature would expand the gas and force a portion of it backwards through the meter and into the main. The reverse stop devices referred to were designed to allow sufficient backward motion of the meter, before the stop was applied, to equalize the excess pressure due to the higher temperature in the piping, thus preventing damage to the meter mechanism.

It will be seen that my invention will take care of such reverse rotation of the meter in normal service, in any amount; but it should be noted that the backward travel of the proving head shaft 110, from the time that the pawl end 115 leaves the pin 118 it has been driving to the time it contacts the adjacent pin in backward rotation, corresponds to about two complete revolutions of the valve crank shaft 91, in the size chosen for illustration. This amount of movement will usually be more than enough to relieve the excess pressure in the piping when the meter comes to rest. When the meter again moves forward, after gas is turned on in an appliance, the pawl end 115 will be carried forward and resume its function of driving the member 117.

In the illustrations shown, the ratio between the gear wheels 122 and 124 is the same as the ratio between the gear wheels 119 and 123 (Fig. 3). If desired, however, and if local regulations permit, the ratio between gear wheels 122 and 124, which wheels drive the index in reverse rotation of the meter, may differ from the ratio between gear wheels 119 and 123, to penalize the fraudulent consumer by registering more on the index in reverse rotation of the meter, for a given quantity of gas, than would be registered in normal meter operation.

An improved stuffing box is provided, especially for use as the crank stuffing box 93, although it may also be used for the flag stuffing boxes 81. In the ordinary meter, stuffing boxes are made gas tight with yarn, felt, or similar packing under pressure, and the wear which takes place after a comparatively short period of service is frequently enough to cause the meter to run fast, because such wear lessens the resistance to meter movement. Under longer service, of course, a leak develops. The stuffing box shown in Fig. 8 will, in long continued service, maintain more closely the frictional resistance existing at the calibration of the meter, remain tighter under wear, and provide a journalling for the valve crank shaft 91 keeping it closer to its original alignment, than the construction employed in the ordinary meter.

In Fig. 8, taken as applied to the crank stuffing box 93, the valve crank shaft 91 carries fast to it a sealing member 137, fashioned from a ball of appropriate composition and hardness, as of bronze or Monel metal, such balls being commercially available with very small limits of accuracy. The sealing member 137 is seated at the bottom of the stuffing box body 138 so as to form a gas tight joint. The bearing surface of the stuffing box body in contact with the sealing member 137 may be finished by pressure or impact from a hardened ball of nearly the same diameter as the ball from which the sealing member 137 was made, or by contact with such a ball rotating on a spindle. A small ball bearing assembly 139, preferably of a type already in commercial production, contacts sealing member 137 from above, and pressure downwards is exerted by a plate spring 140 above the ball bearing assembly 139. The tension of spring 140, and consequently the sealing pressure, is adjusted by turning the threaded stuffing box cap 141. Grease may be introduced into the hollow stuffing box body 138 before complete assembly, and after screwing down the cap 141, a further supply of grease may be deposited in the depression 142. The crank member 96 (Fig. 2) is integrally distinct from valve crank shaft 91, but fastened thereto after said shaft is in place in the stuffing box.

The links 86, 87 (Fig. 1) act as thrust rods over about half their travel. For proper stiffness, therefore, with a given cross sectional area, the moments of inertia about horizontal and vertical axes should be equal. This condition I meet by providing links of symmetrical cross section, preferably round or square, as compared to the links of oblong section of the prior art. These links may be of tinned steel wire. To give proper bearing surfaces, bushings of appropriate composition and hardness are set in the ends of the links, and fastened by solder or otherwise. Increased bearing surface may be provided at small extra expense by increasing the vertical height of these bushings.

In accordance with my invention, the offset flag rod shown in Fig. 2 is made from two opposingly arranged U shaped components, one component having aligned trunnion portions 79 and 80, and transverse extensions between the offset vertical portion 71 and the two trunnion portions; and the other component having the substantially vertical portion 83, and transverse extensions parallel to those of the first component and extending in lapping relation nearly or quite the full length thereof, ending as at 143 and 144. These parallel transverse portions of the components of the flag rod are welded or otherwise joined together. By thus increasing the depth of the transverse portion in the direction in which the pressure of the disc 68 is transmitted, the stiffness of the whole system is markedly increased. This is important because when disc travel varies under different conditions of service, due to varying deflections in the offset flag rod, the accuracy of the meter is correspondingly affected.

Fig. 9 shows an alternative form of my improved offset flag rod, in which one component 145 is substantially vertical, corresponding to portions 79, 83, and 80 of Fig. 2; while the other component has a vertical portion 146 (corresponding to 71 of Fig. 2) and also two retroverted transverse portions embracing component 145, as in 147 and 148, welded or otherwise fastened to vertical component 145, and to each other along their length. This construction also gives the increased depth of transverse portions described in reference to Fig. 2.

While I have herein shown and described my invention in connection with a gas meter of a specific type, certain of the features can obviously be embodied in other types of meters within the scope of the appended claims.

Having thus described my invention, I claim:

1. In a gas meter, an offset flag rod consisting of two generally U shaped components, the legs of the said U shaped components being respectively in lapping relation to each other and fastened together, so as to form two transverse portions connecting two substantially vertical portions of the flag rod.

2. In a gas meter, an offset flag rod consisting of two components, one substantially vertical, and the other substantially U shaped, the U shaped component including a vertical portion connected by two transverse portions to the other component; the transverse portions being double.

3. In a gas meter, a pair of bellows; valves, comprising slide covers and seats for controlling flow of gas into and out of the bellows; mechanism deriving movement from the bellows for actuating the valves including a valve crank shaft with plural cranks, a tangent arm on the shaft, front and rear flag rods, front and rear flag arms on the rods connected by front and rear links to the tangent arm, and crank arms connecting the valve crank shaft with the valves, such that a line drawn from one extreme position of a flag arm bearing axis to the valve crank shaft axis forms an acute angle with a line drawn from the other extreme position of the same flag arm bearing axis to the valve crank shaft axis, said acute angle being substantially equal to the angles between a crank arm and the corresponding axis of valve cover motion when the valve cover is in admission positions.

4. A gas meter as in claim 3, in which the arcs of motion of the flag arm bearing axes included within said acute angles are respectively concave and convex when viewed from the position of the valve crank shaft.

5. A gas meter as in claim 3, in which the positions assumed by the flag arms during their travel are generally transverse to the meter for one flag arm, and generally lengthwise of the meter for the other flag arm.

6. A gas meter as in claim 3, in which the crank-shaft is on one side of the bellows axis and the flag rods are further remote from the bellows axis than the valve crank shaft, and on the same side of said axis as said shaft.

7. A gas meter as in claim 3, in which the axes of valve cover motion are in acute angular relation.

8. A gas meter as in claim 3, in which the cranks are of different diameters to facilitate assembly of the crank arms.

9. In a gas meter, a pair of bellows; valves, comprising slide covers and seats for controlling flow of gas into and out of the bellows; mechanism deriving movement from the bellows for actuating the valves, including a valve crank shaft with plural cranks, a tangent arm on the shaft, front and rear flag rods both on the same side of the bellows axis, front and rear flag arms on the rods connected to the tangent arm by front and rear links, and crank arms connecting the valve crank shaft with the valves, such that a line drawn from one extreme position of a flag arm bearing axis to the valve crank shaft axis forms an acute angle with a line drawn from the other extreme position of the same flag arm bearing axis to the valve crank shaft axis, and such that the arcs of motion of the flag arm bearing axes included within said acute angles are respectively concave and convex when viewed from the position of the valve crank shaft, whereby synchronism in the movements of bellows and valves is produced.

10. A gas meter as in claim 9, in which said acute angle is substantially equal to the angles between a crank arm and the corresponding axis of valve cover motion when the valve cover is in admission positions.

11. A gas meter as in claim 9, in which the front and rear links are of different lengths.

12. A gas meter as in claim 9, in which the positions assumed by the flag arms during their travel are generally transverse to the meter for one flag arm, and generally lengthwise of the meter for the other flag arm.

13. A gas meter as in claim 9, in which the axes of valve cover motion are in acute angular relation.

14. A gas meter as in claim 9, in which the cranks are of different diameters to facilitate assembly of the crank arms.

15. In a gas meter, a pair of bellows; valves, comprising slide covers and seats for controlling flow of gas into and out of the bellows; mechanism deriving movement from the bellows for actuating the valves, including a valve crank shaft with plural cranks, a tangent arm on the shaft, front and rear flag rods, front and rear flag arms on the rods connected to the tangent arm by front and rear links of different lengths, and crank arms connecting the valve crank shaft with the valves, such that a line drawn from one extreme position of a flag arm bearing axis to the valve crank shaft axis forms an acute angle with a line drawn from the other extreme position of the same flag arm bearing axis to the valve crank shaft axis, said acute angle being substantially equal to the angles between a crank arm and the corresponding axis of valve cover motion when the valve cover is in admission positions.

16. A gas meter as in claim 15, in which the arcs of motion of the flag arm bearing axes included within said acute angle are respectively concave and convex when viewed from the position of the valve crank shaft.

17. A gas meter as in claim 15, in which the positions assumed by the flag arms during their travel are generally transverse to the meter for one flag arm, and generally lengthwise of the meter for the other flag arm.

18. A gas meter as in claim 15, in which the axes of valve cover motion are in acute angular relation.

19. A gas meter as in claim 15, in which the cranks are of different diameters to facilitate assembly of the crank arms.

20. In a gas meter, a pair of bellows; slide valves for controlling flow of gas into and out of the bellows; mechanism deriving movement from the bellows for actuating the valves, including a shaft; a sealing member having a spherical surface fast to said shaft; a stuffing box body for said shaft providing a seat for the sealing member; a ball bearing assembly including balls which engage the surface of the sealing member from above; a plate spring imposing pressure upon the ball bearing assembly; and a threaded cap for the stuffing box by which pressure imposed upon the ball bearing assembly may be adjusted.

21. A gas meter as in claim 20, in which a grease accommodating space is provided within the stuffing box above the sealing member and around the ball bearing assembly.

22. In a gas meter, a pair of bellows; slide valves for controlling flow of gas into and out of the bellows; mechanism deriving movement from the bellows for actuating the valves, including a valve crank shaft; a crank member, separate from the valve crank shaft but fast thereto; crank arms connecting the crank member with the valves; a sealing member having a spherical surface fast to said valve crank shaft; a stuffing box body for said valve crank shaft providing a seat for the sealing member; a ball bearing assembly including balls which engage the surface of the sealing member from above; a plate spring imposing pressure upon the ball bearing assembly; and a threaded cap for the stuffing box by which the pressure imposed upon the ball bearing assembly may be adjusted.

23. A gas meter as in claim 22, in which the space within the stuffing box above the sealing member and around the ball bearing assembly and plate spring is filled with grease.

24. In a gas meter, a flag rod comprising two components, one of said components being U shaped, the legs of said U shaped component being fixed to the other component, one of said components having transverse extensions overlapping and fixed to said legs of the U shaped component.

WILLIAM LAIRD BROWN.